UNITED STATES PATENT OFFICE.

HELEN L. RUSSEGUE, OF HARTFORD, CONNECTICUT.

ELASTIC WATERPROOF COMPOSITION.

SPECIFICATION forming part of Letters Patent No. 651,640, dated June 12, 1900.

Application filed December 12, 1898. Renewed November 20, 1899. Serial No. 737,577. (Specimens.)

*To all whom it may concern:*

Be it known that I, HELEN L. RUSSEGUE, of Hartford, in the county of Hartford and State of Connecticut, have invented certain new and useful Improvements in Elastic Waterproof Compositions, of which the following is a specification.

This invention has for its object to provide at a relatively-small expense a composition of matter adapted to be used as a substitute for various well-known materials and adapted to be made into articles of any desired density, rigidity, and elasticity.

The invention consists in a composition comprising balata and vegetable fiber, said composition having the characteristics hereinafter described.

In carrying out my invention I take a sheet of balata and unite with it by pressure a suitable quantity of dry vegetable fiber. The said fiber may be either formed into a sheet which is laid against the sheet of balata or the loose fiber may be sprinkled upon the sheet of balata. I prefer to use equal parts, by weight, of balata and fiber, although the proportion of either ingredient may be increased or diminished. Any suitable vegetable fiber may be used, preference being given to a fiber made by subjecting a vegetable substance, such as wood or straw, to the action of an alkaline solution of a nitrate, as described in Letters Patent of the United States No. 496,400. I do not limit myself, however, to fiber thus produced and may use any suitable vegetable fiber produced in any suitable way.

The pressure which unites the balata and fiber is preferably accompanied by heat, and the heat and pressure may be conveniently applied by passing the two materials between two rolls, one of which—namely, the one next the balata sheet—being heated. After several passes between the rolls, a suitable degree of pressure being applied, the two materials will be found to have become so completely incorporated each into the other that a single homogeneous sheet is the result. I have found that by subjecting this composition of matter to extreme pressure—say twenty to fifty tons to the square inch—a change is produced somewhat analogous to the change produced in rubber by the process of vulcanization, the properties of the composition being changed, so that it is enabled to resist heat and cold, as well as disintegration by centrifugal force or motion, and is adapted to serve as a substitute for vulcanized rubber and various other materials. I have found that the composition is impervious to water and to the strongest acids.

By superimposing a sufficient number of thin sheets of the said composition and subjecting the superimposed pile of sheets to sufficient pressure a practically-homogeneous mass of the composition of any desired thickness can be obtained, the mass showing no laminæ or any traces of having been formed by pressing together a series of sheets. A block or mass thus formed can be turned in a lathe, bored, and otherwise treated, much the same as hard rubber, ivory, and other materials.

Said composition may be given any desired elasticity and may be made practically rigid, its quality in this respect depending upon the degree of pressure applied. The composition is therefore adapted to be used for springs or buffers to resist severe shocks and jars, also as a substitute for paper-pulp in the manufacture of car-wheels and for many other purposes. It may also be used for pneumatic tires for wheels, the composition being impenetrable by the agencies which inflict injury on ordinary pneumatic tires.

It will be seen that since the only operations required to unite the ingredients into a complete and operative composition are heat and pressure, the degree of heat required being relatively small as compared with that required to vulcanize rubber, the composition can be produced at a relatively-small expense. Moreover, balata is a product which is much less expensive than caoutchouc or india-rubber, and it is therefore obvious that my invention furnishes an extremely-economical substitute for caoutchouc and other materials.

I do not claim herein any composition including rubber or caoutchouc, but restrict myself to the employment of balata, which is a material readily distinguished from caoutchouc in many respects. Balata has not the elasticity of caoutchouc under heavy pressure and it differs therefrom in character, the former being more dense and not so pliable, but more cohesive. Balata becomes waterproof and impervious to heat or cold or atmospheric action when in combination with vegetable fiber, while pure balata will deteriorate in vitality under the action of the atmosphere whether it has been put under pressure or not. The fiber and the balata each changes its character when added to the other, and the two when combined make a new substance capable of many utilities without being amalgamated by the use of glycerin or any other foreign substance.

I claim—

1. A composition of matter comprising balata and vegetable fiber.

2. A composition of matter comprising balata and wood fiber.

In testimony whereof I have affixed my signature in presence of two witnesses.

HELEN L. RUSSEGUE.

Witnesses:
A. D. HARRISON,
P. W. PEZZETTI.